(12) United States Patent
Niléhn et al.

(10) Patent No.: US 7,916,181 B2
(45) Date of Patent: Mar. 29, 2011

(54) METHOD AND DEVICE FOR CREATING HIGH DYNAMIC RANGE PICTURES FROM MULTIPLE EXPOSURES

(75) Inventors: Johan Niléhn, Lomma (SE); Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 624 days.

(21) Appl. No.: 11/814,834

(22) PCT Filed: Jan. 31, 2006

(86) PCT No.: PCT/EP2006/050559
§ 371 (c)(1), (2), (4) Date: Feb. 7, 2008

(87) PCT Pub. No.: WO2006/082186
PCT Pub. Date: Aug. 10, 2006

(65) Prior Publication Data
US 2008/0316354 A1    Dec. 25, 2008

(30) Foreign Application Priority Data
Feb. 3, 2005 (EP) .................... 05100748

(51) Int. Cl.
*H04N 5/235* (2006.01)
*H04N 5/228* (2006.01)

(52) U.S. Cl. .................. 348/222.1

(58) Field of Classification Search .......... None
See application file for complete search history.

(56) References Cited

U.S. PATENT DOCUMENTS

| | | | | |
|---|---|---|---|---|
| 6,831,689 | B2 * | 12/2004 | Yadid-Pecht | 348/297 |
| 6,999,604 | B1 * | 2/2006 | Kim et al. | 382/107 |
| 7,092,019 | B1 | 8/2006 | Ogata et al. | |
| 2002/0135683 | A1 * | 9/2002 | Tamama et al. | 348/222 |
| 2003/0128893 | A1 * | 7/2003 | Castorina et al. | 382/284 |
| 2004/0239775 | A1 | 12/2004 | Washisu | |
| 2005/0219391 | A1 * | 10/2005 | Sun et al. | 348/255 |

FOREIGN PATENT DOCUMENTS

| | | |
|---|---|---|
| EP | 1 313 066 | 5/2003 |
| JP | 8-331574 | 12/1996 |
| JP | 2000-341582 | 12/2000 |

(Continued)

OTHER PUBLICATIONS

"High Dynamic Range from Multiple Images: Which Exposures to Combine?" IEEE International Workshop on Color and Photometric Methods in Computer Vision 2003, Oct. 2003.*

(Continued)

*Primary Examiner* — Sinh Tran
*Assistant Examiner* — Jason A Flohre
(74) *Attorney, Agent, or Firm* — Renner, Otto, Boisselle & Sklar, LLP

(57) ABSTRACT

The invention relates to a method and a device for creating pictures and more particularly a method for creating an enhanced picture by means of several consecutive exposures. The exposures are combined to create pictures with enhanced properties, especially better color and light content. Sufficient light is obtained by performing a series of first exposures together with one second exposure in rapid succession. The first exposures are combined to provide sufficient luminance and sharpness. The second exposure is made to collect color information. The first exposures are combined with the second exposure to provide an enhanced picture.

30 Claims, 2 Drawing Sheets

FOREIGN PATENT DOCUMENTS

| JP | 2002-232777 | 8/2002 |
|---|---|---|
| JP | 2004-357202 | 12/2004 |
| SU | 781740 | 11/1980 |

OTHER PUBLICATIONS

International Search Report for corresponding Application No. PCT/EP2006/050559 mailed Apr. 4, 2006.

Form PCT/ISA/237 for corresponding Application Application No. PCT/EP2006/050559.

M. D. Grossberg and S. K. Nayar; "High dynamic range from multiple images: Which exposures to combine?"; IEEE International Workshop on Color and Photometric Methods in Computer Vision 2003 At International Conference on Computer Vision (ICCV); Oct. 2003; p. 2; XP002330392.

Cho Won-Ho et al.; "Extending dynamic range of two color images under different exposures"; Pattern Recognition 2004. ICPR 2004. Proceedings of the 17$^{th}$ International Conference on Cambridge, UK; Aug. 23-26, 2004; Piscataway, NJ; USA, IEEE, vol. 4; pp. 853-856; XP010724054.

Battaito S. et al.; "High Dynamic Range Imagining for Digital Still Camera: An Overview"; Journal of Electronical Imaging, SPIE + IS&T, US; vol. 12, No.; Jul. 2003; pp. 459-469; XP009020985.

Bogoni L. et al.; "Image enhancement using pattern-selective color image fusion"; Image Analysis and Processing; 1999 Proceedings; International Conference on Venice, Italy; Sep. 27-29, 1999; Los Alamitos, CA USA; IEEE Computer Soc., Sep. 27, 1999; pp. 44-49; XP010354346.

Bogoni L.; "Extending dynamic range of monochrome and color images through fusion"; Pattern Recognition, 2000. Proceedings; 15$^{th}$ International Conference on Sep. 3-7, 2000, Los Alamitos, CA, USA, IEEE Computer Soc., Sep. 3, 2000; pp. 7-12; XP010533220.

* cited by examiner

METHOD AND DEVICE FOR CREATING HIGH DYNAMIC RANGE PICTURES FROM MULTIPLE EXPOSURES

FIELD OF THE INVENTION

The present invention relates to a method for creating pictures and more particularly a method for creating an enhanced picture by means of several consecutive exposures. The exposures are combined to create pictures with enhanced properties, especially better colour and light content.

The invention also relates to a device employing the method.

STATE OF THE ART

Today digital cameras are widely used and sold in a wide range including advanced cameras having high resolution image sensors with over 10 Mpixels and simpler cameras, e.g. incorporated in mobile telephones. Generally, there is a problem when taking pictures in low-light conditions. If the shutter speed is too short, the image does not get sufficient light (underexposure). On the other hand, if the shutter speed is too long, the picture gets bad due to shaking of the hand when holding the camera or if the object moves.

A common solution is to use a flash or a photo light. However, often it is preferred to use the natural, available light. Also, some smaller cameras are not adapted for flash or have not a flash built in. Furthermore, a flash adds costs to the camera.

SUMMARY OF THE INVENTION

In the present invention sufficient light is obtained by performing a series of first exposures together with one second exposure in rapid succession. The first exposures are combined to provide sufficient luminance and sharpness. The second exposure is made to collect colour information. The first exposures are combined with the second exposure to provide an enhanced picture.

In a first aspect, the invention provides a method for creating a picture comprising the steps of:
exposing a light sensitive sensor to a series of exposures,
of which a number N are first exposures that may be underexposed, and of which one is a second exposure having a relatively greater exposure,
wherein luminance data (Y) of the N first exposures is used to create sharpness in the finished picture, and chrominance data (UV) of the second exposure is used to create colour content in the finished picture.

Suitably, luminance data (Y) of the N first exposures is stored in a memory.

In a preferred embodiment, the number N of first exposures is greater than 1 and luminance data of the latest first exposure is added to the luminance data (Y) existing in the memory.

Preferably, the luminance data (Y) is added with a correction for sharpness enhancement.

In a preferred embodiment, an off-set vector is calculated, the off-set vector representing the difference resulting from motion between the latest first exposure and the contents of the memory, the off-set vector being used during the addition when addressing the memory.

Preferably, the luminance data (Y) is optimized for a large luminance value.

Suitably, the luminance data (Y) is a weighted sum of the three colour channels Red (R), Green (G), and Blue (B).

The weights of the three colour channels Red (R), Green (G), and Blue (B) may be equal (Y=R+G+B).

Suitably, the chrominance data (UV) and luminance data (Y) are sent for processing in an image processor.

In a preferred embodiment, the second exposure is performed last, and the chrominance data (UV) is read from the sensor and the luminance data (Y) is read from the memory.

Suitably, the number N of the first exposures ranges from 2 to 8 (2≦N≦8).

The first exposures may have shorter individual exposure times than the second exposure.

Suitably, the sum of the exposure times of the N first exposures approximately equals the exposure time of the second exposure.

The first exposures may be made with a smaller aperture than the second exposure.

Suitably, the sum of the exposures of the N first exposures approximately equals the second exposure.

In a second aspect, the invention provides a device for creating a picture, comprising an optical system for exposing a light sensitive sensor, memory means for storing image data, and a processor capable of processing image data.

According to the invention, the optical system is arranged to expose the light sensitive sensor to a series of exposures, of which a number N are first exposures that may be underexposed, and of which one is a second exposure having a relatively greater exposure, and the processor is arranged to use luminance data (Y) of the N first exposures to create sharpness in the finished picture, and to use chrominance data (UV) of the second exposure to create colour content in the finished picture.

Suitably, the processor is arranged to store luminance data (Y) of the N first exposures in the memory.

In a preferred embodiment, the number N of first exposures is greater than 1 and the processor is arranged to add luminance data of the latest first exposure to the luminance data (Y) existing in the memory.

Preferably, the processor is arranged to add the luminance data (Y) with a correction for sharpness enhancement.

In a preferred embodiment, the processor is arranged to calculate an off-set vector, the off-set vector representing the difference resulting from motion between the latest first exposure and the contents of the memory, and to use the off-set vector during the addition when addressing the memory.

Preferably, the luminance data (Y) is optimized for a large luminance value.

Suitably, the processor is arranged to extract the luminance data (Y) as a weighted sum of the three colour channels Red (R), Green (G), and Blue (B).

The weights of the three colour channels Red (R), Green (G), and Blue (B) may be equal (Y=R+G+B).

Suitably, the processor is arranged to receive the chrominance data (UV) from the sensor (3) and luminance data (Y) from the memory.

In a preferred embodiment, the optical system is arranged to perform the second exposure last, and the processor is arranged to read the chrominance data (UV) from the sensor and to read the luminance data (Y) from the memory.

Suitably, the number N of the first exposures ranges from 2 to 8 (2≦N≦8).

The first exposures may have shorter individual exposure times than the second exposure.

Suitably, the sum of the exposure times of the N first exposures approximately equals the exposure time of the second exposure.

The first exposures may be made with a smaller aperture than the second exposure.

Suitably, the sum of the exposures of the N first exposures approximately equals the second exposure.

BRIEF DESCRIPTION OF THE DRAWINGS

The invention will be described in detail below with reference to the accompanying drawings, of which.

DETAILED DESCRIPTION OF PREFERRED EMBODIMENTS

The invention relates to a method for creating pictures and a device using the method, e.g. a digital camera, a mobile telephone etc. As mentioned in the introduction, the invention is useful in advanced as well as in simple cameras when it is desired to take a picture in low-light conditions using the available light. In some instances it is not desired to use a flash and with simpler cameras it is not always possible.

Figure 1:
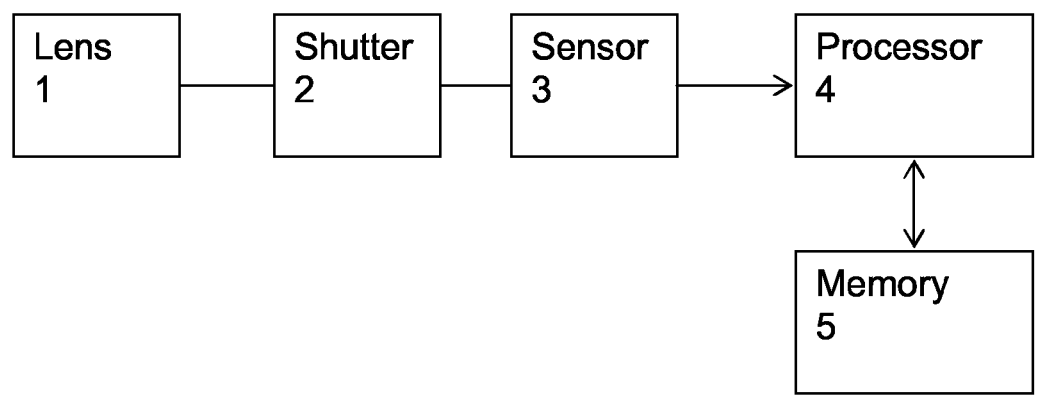
FIG. 1 is a schematic view of relevant parts of a camera according to the invention.

FIG. 1 illustrates relevant parts of a camera according to the invention. The camera comprises an optical system including a lens 1 and a shutter 2. The optical system exposes a light sensitive sensor 3 to light. A control unit comprising a processor 4 controls the operations of the lens 1 and shutter 2. The shutter 2 may be a mechanical shutter or the sensor 3 may be controlled electronically to obtain a desired exposure time. The processor 4 communicates with the sensor 3 and with a memory 5, in which image data may be stored and retrieved. The processor 4 is capable of performing the necessary calculations for image processing.

The lens 1, shutter 2 and sensor 3 may be of conventional design. A wide range of components with varying quality and performance already exists on the market. Also, image processors handling image data in various ways are previously known. These components will not be described in detail in the present application. The memory 5 may be a working space of a memory incorporated in the device or may exist on a separate, removable memory card, storing working data as well as finished pictures. The processor and memory may be integrated in the camera design or reside externally or be shared with other functionalities.

For convenience, the general working principle of a light sensitive sensor, such as sensor 3, is described. The sensor comprises a number of light sensitive picture elements, so called pixels, typically between 1 and 10 Mpixels (million pixels) distributed over the sensor area. When light impinges on a pixel, the pixel produces a current that is integrated to obtain a light intensity value. To make the sensor colour sensitive, each pixel is provided with a colour filter, either red, green or blue, in a predetermined mosaic pattern over the sensor. Each pixel is assigned a three-component colour value expressed in components of R, G or B, by mathematical interpolation and digitalisation of its own and neighbouring pixel values. This is conventionally performed by an image processor. Conventionally the picture format is separated by transformation into a luminance part and a chrominance part. The luminance part Y is a light intensity value and corresponds to a black and white picture. Y is calculated as a weighted sum of the three colour channels, normally as $Y=0.299R+0.587G+0.114B$. The chrominance part UV consists of two components, wherein $U=B-Y$ and $V=R-Y$. U and V can also be calculated directly from the RGB values.

The RGB factors may be adjusted to achieve a correct balance between the colours, so that the correct white balance is achieved. This may depend on the available light such as daylight, incandescent lights etc, as is known in the art.

Figure 2:
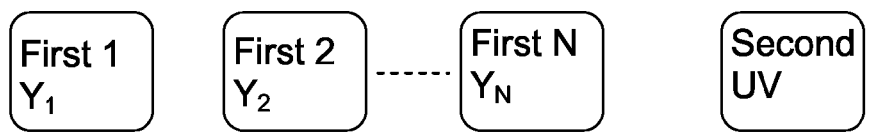
FIG. 2 is a schematic view of a series of exposures made in accordance with the method of the invention.

According to the present invention, a novel methodology is used to obtain sufficient light and colour in the finished picture. The basic principle is illustrated in FIG. 2. Initially, a series of N first exposures is taken in rapid succession. The first exposures are either taken with a short exposure time and/or with a small aperture. A short exposure time will reduce motion blurredness, while a small aperture will increase the depth of field. Each first exposure is sharp and in principle underexposed but all pixels exposed to light contributes with a luminance value Y. The luminance values $Y_1$ to $Y_N$ are combined to get sufficient luminance in the picture. The luminance values are preferably combined in such a way that image movement between the first exposures are taken into account and a correction is made. Finally, the sensor is exposed to a second exposure. The second exposure is either taken with a long exposure time and/or with a large aperture resulting in a greater exposure than the first exposures. The exposure is sufficient to ensure that the light sensor is exposed to enough light to get good colour information. The second exposure can be expected to be less sharp than the others due to hand shake (or decreased depth of field). It will however receive more light and contain more valuable colour information not captured by the first exposures in the series. The colour data should preferably not be digitally enhanced. If the colour data is digitally enhanced there may be a lot of noise in the picture, especially from the blue. The luminance information Y and the chrominance information UV from exposures are combined together to form the finished picture.

Even if the second exposure might be shaky due to movement, this will not deteriorate the finished picture in a noticeable way. It is a known fact that the human eye is not sensitive to blurredness in the colour information. The human vision is predominantly sensitive to the luminance part Y for perceiving image details.

Before the method of the invention starts, the camera is set as is conventional by adjusting the focus of the lens, selecting a total exposure time and aperture setting (F stop value). Various exposure programs may be available. The user may also select to zoom in and out with the optical system. In accordance with a preferred embodiment of the invention, a number N of first exposures is selected to be consistent with the total exposure time. N may be any number (including 1), but suitably ranges from 2 to 8. The first exposures may have the same exposure time, or the first exposure times may vary between the first exposures in accordance with a predefined program. The second exposure time is also selected to be consistent with the total exposure time. In an exemplary embodiment, the total of the first exposure times is approximately equal to the second exposure time. With a number N=8 first exposures, one first exposure would be approximately an eighth of a second exposure. The total exposure time is the sum of the first exposures and the second exposure.

Figure 3:
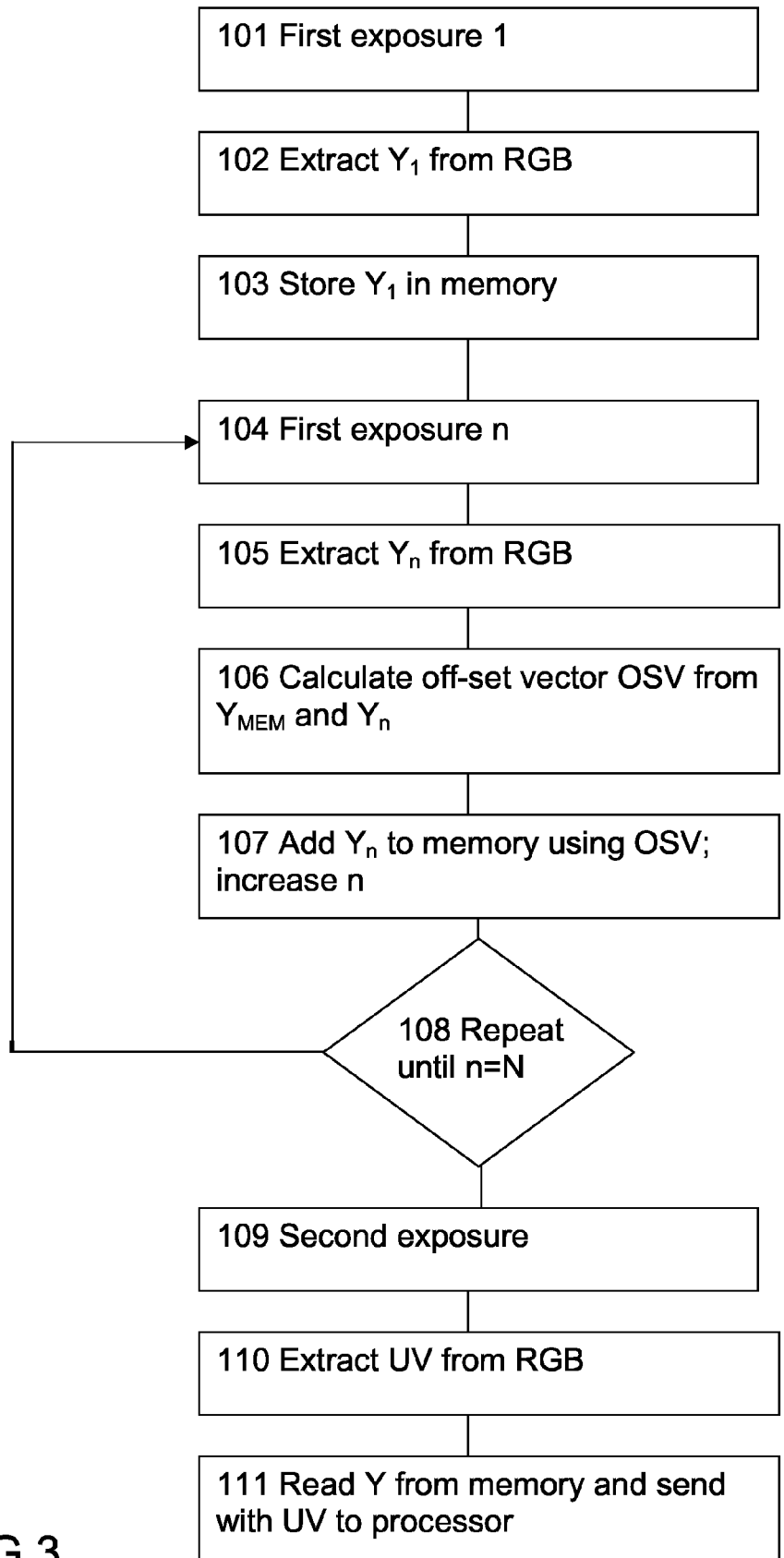
FIG. 3 is a flow diagram of a preferred embodiment of the method according to the invention.

The method is described step by step with reference to the flow diagram of FIG. 3.

101. The initial first exposure is made.

102. As is outlined above, RGB values are calculated for all pixels. The luminance information $Y_1$ is extracted from the three colour channels RGB. All calculations are made by the processor 4. As only the luminance information is of interest, a proper white balance is not necessary. Thus, the luminance Y may be calculated as $Y=R+B+G$ with a weighting factor assigned to each component. Commonly, this weighting is optimized for good colour reproduction. The weighting factor may however be optimised in such a way that noise is minimised in the resulting Y channel without taking the colour properties into account. It is also feasible to use equal weights.

103. The luminance information $Y_1$ is stored in the memory 5. Note that the chrominance information UV need not be calculated at all and is preferably not stored in memory.

104. Next first exposure n is made after a short interval. The interval should of course be as small as possible to minimize any movement between the exposures.

105. Again, luminance information is extracted from the sensor to form $Y_n$.

106. In a preferred embodiment, the luminance information $Y_n$ is not stored individually in the memory 5. Instead, the luminance information $Y_n$ is added to the luminance information $Y_{MEM}$ already existing in the memory 5. In this way only one complete set of luminance data Y is stored in memory 5.

However, the image captured on the sensor 3 may have moved since the previous exposure, either due to movement of the whole camera or due to movement of the object being photographed. For a simpler calculation it is assumed that the whole camera has moved and that the movement is equal over all pixels of the sensor. An offset vector OSV is calculated to take the movement into account. The off-set vector represents the difference resulting from motion between the latest first exposure and the contents of the memory 5.

107. The luminance information $Y_n$ is thus added into the memory 5 to the previously existing luminance data, and the offset vector OSV is used to address the memory 5 so that all pixel values are added in the correct places.

108. The loop 104 to 107 is repeated N times, i.e. n goes from 1 to N. As is mentioned above, N may be fixed or may vary in accordance with the desired exposure time. After N loops, the total luminance data Y exists in memory 5.

109. After the series of N first exposures, a second exposure is made. This should be sufficient to obtain colour data from the sensor without having to enhance the colour data digitally.

110. The chrominance values UV are extracted from the RGB values of the sensor 3. This may be done by first calculating the luminance Y and then the chrominance UV or, in an alternative, the chrominance UV directly from the RGB values, all with the correct white balance. (The white balance may be adjustable as mentioned above.) Since this second exposure probably is blurry, the luminance data Y from this second exposure is not used and need not be calculated, unless it is practical from a programming point of view to calculate the UV data through the luminance Y.

111. The chrominance values UV are not stored together with the total luminance data Y, now existing in the memory 5. Instead, the luminance Y and chrominance UV are sent "on the fly" to the processor 4 for conventional image processing. As is conventional, chrominance values UV are only assigned to every second pixel to save memory space and processor capacity.

The chrominance values UV may also be stored in the memory 5 before being sent together with the luminance data Y for further image processing. It should be noted that some working memory area may be necessary for storing the latest luminance data Y from a first exposure in order to calculate the offset vector by comparing the information with the previously captured luminance data Y stored at another memory area. This working memory area is not needed after the capturing of all the first exposures. Thus it can be used for storing the final chrominance values UV.

In an alternative, an offset vector OSV is formed by comparing the luminance data Y of the second exposure with the luminance data $Y_{MEM}$ contained in the memory 5. This offset vector OSV is used when combining the chrominance data UV of the second exposure with the total luminance data Y.

In a further alternative, the last offset vector OSV used when adding the last luminance data $Y_N$ into memory 5 is also used when combining the chrominance data UV of the second exposure with the total luminance data Y. This method assumes that the last calculated offset vector is suitable for calculating the offset vector of the second exposure. Since the eye is less sensitive to blurredness in the chrominance image, this offset vector is not critical.

It is not necessary that the second exposure is made last, but may be made before or in between "first" exposures. However, in that case the chrominance data UV has to be stored until the last of the "first" exposures has been made. This requires more memory space.

In the processor 4, conventional image processing may be performed, such as subtraction of black level, gamma adjustment, contrast adjustment, error correction of erroneous pixels, digital sharpening, and JPEG compression. This is performed on the finished picture created by means of the present invention and does not form part of the present invention. Thus, it is not described in detail here.

By means of the present invention it is possible create a sharp image with correct exposure and colour information even in under low-light conditions. The invention enables using available light rendering a flash redundant in many situations. Less or no electric amplification of the colour information is needed, which results in less noise in the finished picture. The invention enables taking sharp pictures despite long exposure times. The scope of the invention is only limited by the claims below.

The invention claimed is:

1. A method for creating a picture comprising the steps of:
exposing a light sensitive sensor to a series of exposures, of which a series of N are first exposures that may be underexposed and are taken in rapid succession, and of which one is a second exposure having a relatively greater exposure than the first exposures,
wherein the method further comprises the steps of collecting and combining luminance data (Y) of the N first exposures to create sharpness in the finished picture;
collecting chrominance data (UV) of the second exposure to create colour content in the finished picture; and
combining the collected and combined luminance data (Y) and the collected chrominance data (UV) to create the finished picture.

2. A method according to claim 1, wherein luminance data (Y) of the N first exposures is stored in a memory.

3. A method according to claim 2, wherein the number N of first exposures is greater than 1 and luminance data of the latest first exposure is added to the luminance data (Y) existing in the memory.

4. A method according to claim 3, wherein the luminance data (Y) is added with a correction for sharpness enhancement.

5. A method according to claim 4, wherein an off-set vector is calculated, the off-set vector representing the difference resulting from motion between the latest first exposure and the contents of the memory, the off-set vector being used during the addition when addressing the memory.

6. A method according to claim 1, wherein the luminance data (Y) is optimized for a large luminance value.

7. A method according to claim 6, wherein the luminance data (Y) is a weighted sum of the three colour channels Red (R), Green (G), and Blue (B).

8. A method according to claim 7, wherein the weights of the three colour channels Red (R), Green (G), and Blue (B) are equal (Y=R+G+B).

9. A method according to claim 1, wherein the chrominance data (LTV) and luminance data (Y) are sent for processing in an image processor.

10. A method according to claim 9 wherein luminance data (Y) of the N first exposures is stored in a memory, the chrominance data (UV) and luminance data (Y) are sent for processing in an image processor, the second exposure is performed last, and the chrominance data (UV) is read from the sensor and the luminance data (Y) is read from the memory.

11. A method according to claim 1, wherein the number N of the first exposures ranges from 2 to 8 ($2 \leq N \leq 8$).

12. A method according to claim 1, wherein the first exposures have shorter individual exposure times than the second exposure.

13. A method according to claim 12, wherein the sum of the exposure times of the N first exposures approximately equals the exposure time of the second exposure.

14. A method according to claim 1, wherein the first exposures are made with a smaller aperture than the second exposure.

15. A method according to claim 14, wherein the sum of the exposures of the N first exposures approximately equals the second exposure.

16. A device for creating a picture comprising an optical system for exposing a light sensitive sensor, memory means for storing image data, and a processor capable of processing image data, wherein:
the optical system is arranged to expose the light sensitive sensor for a series of exposures, of which a number N are first exposures that may be underexposed and are taken in rapid succession, and of which one is a second exposure having a relatively greater exposure than the first exposures,
and the processor is arranged to combine luminance data (Y) of the N first exposures to create sharpness in the finished picture, with chrominance data (UV) of the second exposure to create colour content in the finished picture.

17. A device according to claim 16, wherein the processor is arranged to store luminance data (Y) of the N first exposures in the memory.

18. A device according to claim 17, wherein the number N of first exposures is greater than 1 and the processor is arranged to add luminance data of the latest first exposure to the luminance data (Y) existing in the memory.

19. A device according to claim 18, wherein the processor is arranged to add the luminance data (Y) with a correction for sharpness enhancement.

20. A device according to claim 19, wherein the processor is arranged to calculate an off-set vector, the off-set vector representing the difference resulting from motion between the latest first exposure and the contents of the memory, and to use the off-set vector during the addition when addressing the memory.

21. A device according to claim 16, wherein the luminance data (Y) is optimized for a large luminance value.

22. A device according to claim 21, wherein the processor is arranged to extract the luminance data (Y) as a weighted sum of the three colour channels Red (R), Green (G), and Blue (B).

23. A device according to claim 22, wherein the weights of the three colour channels Red (R), Green (G), and Blue (B) are equal (Y=R+G+B).

24. A device according to claim 16, wherein the processor is arranged to receive the chrominance data (UV) from the sensor and the luminance data (Y) from the memory.

25. A device according to claim 16, wherein the processor is arranged to store luminance data (Y) of the N first exposures in the memory, the processor is arranged to receive the chrominance data (UV) from the sensor and the luminance data (Y) from the memory, and the optical system is arranged to perform the second exposure last.

26. A device according to claim 16, wherein the number N of the first exposures ranges from 2 to 8 ($2 \leq N \leq 8$).

27. A device according to claim 16, wherein the first exposures are set to have shorter individual exposure times than the second exposure.

28. A device according to claim 27, wherein the sum of the exposure times of the N first exposures approximately equals the exposure time of the second exposure.

29. A device according to claim 16, wherein the first exposures are set to be made with a smaller aperture than the second exposure.

30. A device according to claim 29, wherein the sum of the exposures of the N first exposures approximately equals the second exposure.

* * * * *